Patented Dec. 18, 1951

2,578,761

UNITED STATES PATENT OFFICE 2,578,761

ALKANOLAMINE SALTS OF SULFAQUINOXALINE

Roger S. Sweet, Highland Park, and William L. Benson, Woodbridge, N. J., assignors to Merck & Co., Inc., Rahway, N. J., a corporation of New Jersey No Drawing. Application February 7, 1950, Serial No. 142,932

5 Claims. (Cl. 260—239.65)

This invention relates to new and improved compounds of sulfaquinoxaline useful as therapeutic agents in the treatment of poultry and animals. These compounds because of their unique physical properties may be more readily prepared as crystalline solids and may be formulated more easily than sulaquinoxaline and its previously known derivatives.

More particularly, our invention is concerned with new water-soluble salts of sulfaquinoxaline (2-sulfanilamidoquinoxaline), which salts are much more readily soluble in water than alkaline earth metal salts and in addition possess the surprising and totally unexpected properties of being substantially less hygroscopic and more readily prepared in the crystalline state than the alkali metal salts of sulfaquinoxaline.

Chickens and other domestic fowls, such as turkeys, geese, and ducks, are subject to a disease known as coccidiosis, which is apparently caused by coccidia, and this disease results in the death of a great many domestic fowl each year. Since this constitutes a serious economic loss to farmers and to others who grow and raise poultry for the market or for their eggs, there has of late been developed a treatment for the disease which involves medication of the poultry by the use of the chemical compound sulfaquinoxaline. The chemical compound has been supplied to poultry as an ingredient in their feed, or as a constituent of their drinking water, or as an injectable solution.

Since sulfaquinoxaline itself is not very soluble in water, it has been customary when the active therapeutic agent is administered in solution form for chickens or other poultry, to use it in the form of its alkali metal salts. Unfortunately, while the alkali metal salts of sulfaquinoxaline are quite soluble in water, these alkali metal salts are also hygroscopic to a considerable degree and are extremely difficult to prepare and handle as solid preparations. At the same time it will be evident that solid preparations such as tablets and powders which can be readily dissolved in water provide a convenient and preferred form of sulfaquinoxaline for the preparation of medicated drinking water and parenteral solutions.

In addition to caking problems in the production of solid forms of the alkali metal salts of sulfaquinoxaline, the hygroscopic nature of these salts causes serious difficulty in the storage and handling of solid preparations. Thus when the farmer stores a salt such as sodium sulfaquinoxaline, in powder or tablet form, the material absorbs water from the air and may cake or liquefy in the container. It will be appreciated, therefore, that the very considerable degree of hygroscopicity of the alkali metal salts of sulfaquinoxaline is a serious drawback to their widespread utilization for the medication of poultry.

We have now discovered that by reacting sulfaquinoxaline with lower aliphatic amino alcohols, new salts of sulfaquinoxaline can be prepared, which have the unique property of being both readily soluble in water and essentially non-hygroscopic, and which are therefore free of the disadvantages characteristic of sulfaquinoxaline and its alkali metal salts. In other fields hydroxyamine salts are generally more hygroscopic than the corresponding alkali metal salts. It is therefore surprising and completely unexpected to find that the salts of sulfaquinoxaline with lower hydroxy aliphatic amines are considerably less hygroscopic than the alkali metal salts and may be much more readily prepared in the crystalline state. Among the amino alcohols which are particularly suitable for the preparation of these new salts are the lower aliphatic amino alcohols such as monoethanolamine, diethanol amine, triethanol amine, 2-amino-2-methyl-1-propanol, and the like.

The new amino alcohol salts of sulfaquinoxaline are equally as effective in controlling coccidiosis in chickens and other domestic fowl as sulfaquinoxaline and its alkali metal salts when administered in the feed, or by introduction into their drinking water. Additionally, in tests in which the amino alcohol salts of sulfaquinoxaline were administered parenterally, amino alcohol sulfaquinoxaline salts were found to be of a low order of toxicity. Thus, when administered subcutaneously to chickens, no mortality was observed when 500 mg. of the new compound per kilogram of chicken was introduced.

In preparing the new salts of sulfaquinoxaline, the chemical compounds sulfaquinoxaline and a lower aliphatic amino alcohol are brought together under conditions wherein they will chemically unite and form the desired new compound. It is advantageous, although not essential, to react the sulfaquinoxaline and the amino alcohol in the presence of a liquid medium or a solvent. Such a solvent may consist of excess amino alcohol, water or an aqueous solution, or it may be one of the commercially used organic solvents such as the various lower aliphatic alcohols including ethanol, isopropanol and butanol; acetone and similar organic solvents may also be used.

In the preparation of amino alcohol salts of sulfaquinoxaline, in accordance with our preferred procedure, we mix the chemical compound sulfaquinoxaline with an aqueous or organic solvent solution of an amino alcohol, the amino alcohol being present somewhat in excess of the amount theoretically required for the chemical reaction. Thus, the amino alcohol may be present in an amount ranging up to 100% in excess of the theoretical. The mixture is then heated and, on cooling, the amino alcohol salt of sulfaquinoxaline precipitates and may be recovered in crystalline form. If further purification of the chemical compound is necessary, or if it is desired for any reason, it may be effected by washing with an organic solvent such as any of those specified above.

While it is advantageous to carry out the reaction by admixing sulfaquinoxaline and an aqueous solution of an amino alcohol, or by bringing sulfaquinoxaline and an amino alcohol together in the presence of liquid such as water, or some aqueous solution, it is also possible to react the two components in the presence of an organic solvent in which the amino alcohol is soluble. The essential factor in forming the new chemical compound is that the amino alcohol and sulfaquinoxaline shall be brought together into intimate contact, so that they may immediately react chemically. It has been found that, under all conditions, the yields of the amino alcohol salt of sulfaquinoxaline are high, and that the product is readily crystallizable and can be easily recovered in substantially pure form.

Various methods by which the new chemical compounds possessing the desirable therapeutic activity of sulfaquinoxaline against poultry coccidiosis, and capable of administration to poultry at high concentration levels may be prepared, are illustrated in the following examples.

EXAMPLE 1

*Ethanolamine salt of sulfaquinoxaline*

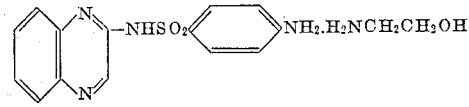

10 g. of sulfaquinoxaline, 4 ml. of ethanolamine (100% in excess of the theoretical amount required for the reaction), and 2 ml. of water were placed in a flask, and the mixture was stirred and heated on a steam bath for about 1 hour, until homogeneous. The mixture was cooled, and a brown, hard, crystalline cake formed. The cake was crushed, slurried with about 30 ml. of acetone containing a few drops of ethanolamine, filtered, and air-dried. There was obtained 6 g. (50%) of light yellow, crystalline salt that begins to decompose at about 150° C. and becomes brown at 220–230° C. It does not melt up to 285° C. Anal.: Calc'd. for $C_{16}H_{19}N_5SO_3$: C, 53.2%; H, 5.27%; N, 19.4%; sulfaquinoxaline, 83.2%. Found: C, 52.88%; H, 5.32%; N, 19.58%; sulfaquinoxaline (spectrographic), 83.0%. The salt is soluble in water giving a clear solution of about pH 8.5. A sample was stored for one week at 100% relative humidity, at the end of which time it was found to be a dry solid.

EXAMPLE 2

*Ethanolamine salt of sulfaquinoxaline*

5250 g. of sulfaquinoxaline, 10 l. of isopropanol, and 2100 ml. of ethanolamine (100% in excess of the theoretical amount required for the reaction) were placed in a flask, and the mixture was stirred and refluxed for 24 hours on a steam bath. The mixture was allowed to cool and crystallize, and the solid salt was removed by filtration and dried at 30° C. in vacuo. There was obtained 5420 g. (85.7%) of the ethanolamine salt of sulfaquinoxaline. An additional 226 g. of salt was obtained by concentration of the mother liquors, followed by slow crystallization from the concentrates.

EXAMPLE 3

*Diethanolamine salt of sulfaquinoxaline*

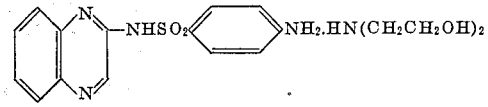

10 g. of sulfaquinoxaline, 7 g. of diethanolamine, and 5 g. of water were mixed and the mixture was heated on a steam bath at 60–65° C. for 45 minutes. A thin, tan paste formed which suddenly solidified on cooling with stirring.

The solid was dissolved in about 1 l. of hot (50° C.) acetone, the solution was cooled, about 2.5 l. of petroleum ether (30–60° C.) was added, and the solution was further cooled to about −18° C. Fine, light yellow crystals of the diethanolamine salt of sulfaquinoxaline formed and were removed by filtration, yield, 9.5 g. (70%). The salt does not melt up to 270° C. but appears to sublime.

EXAMPLE 4

*Triethanolamine salt of sulfaquinoxaline*

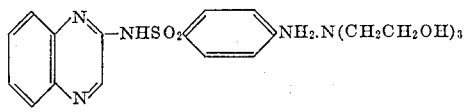

10 g. of sulfaquinoxaline, 10 g. of triethanolamine, and 5 g. of water were mixed, and the mixture was heated on a steam bath at 60–65° C. for 1 hour. A thin, tan paste formed which suddenly solidified on cooling with stirring.

The solid was dissolved in about 2 l. of hot acetone, and the solution was cooled to about −18° C. Fine, light yellow crystals of the triethanolamine salt of sulfaquinoxaline formed and were removed by filtration; yield, 13.5 g. (90%). The salt starts to decompose at about 140° C., becomes brown from about 160–175° C., and melts at about 182° C.

EXAMPLE 5

*2-amino-2-methyl-1-propanol salt of sulfaquinoxaline*

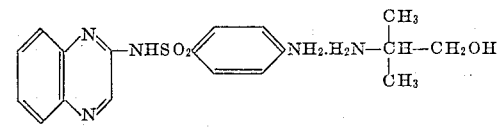

10 g. of sulfaquinoxaline, 6 g. of 2-amino-2-methyl-1-propanol, and 5 g. of water were mixed, and the mixture was heated on a steam bath to 60–65° C. and was maintained in that temperature range for 2–3 minutes. A clear, dark brown syrup formed which solidified on cooling with stirring.

The solid was dissolved in about 2 l. of hot acetone, the solution was cooled, about 2 l. of petroleum ether was added, and the solution was further cooled to about −18° C. Light yellow crystals of the 2-amino-2-methyl-1-propanol salt of sulfaquinoxaline formed and were removed by filtration; yield 12.0 g. (93%). The salt starts to decompose and turn brown at about 255° C. and melts at 257° C.

The foregoing description and examples are intended to be illustrative only. Modifications therefrom, or variations therein, insofar as they conform to the spirit of our invention, are intended to be included within the scope of the appended claims.

We claim:

1. An alkamine salt of sulfaquinoxaline selected from the group consisting of the ethanolamine, diethanolamine, triethanolamine, and 2-amino-2-methyl-1-propanol salts of sulfaquinoxaline.
2. The ethanolamine salt of sulfaquinoxaline.
3. The diethanolamine salt of sulfaquinoxaline.
4. The triethanolamine salt of sulfaquinoxaline.
5. The 2-amino-2-methyl-1-propanol salt of sulfaquinoxaline.

ROGER S. SWEET.
WILLIAM L. BENSON.

REFERENCES CITED

The following references are of record in the file of this patent:

UNITED STATES PATENTS

| Number | Name | Date |
| --- | --- | --- |
| 2,186,773 | Stuart | Jan. 9, 1940 |
| 2,411,495 | Dohrn et al. | Nov. 19, 1946 |
| 2,419,230 | Ruskin | Apr. 22, 1947 |
| 2,429,404 | Dixon et al. | Oct. 21, 1947 |
| 2,442,602 | Hubner | June 1, 1948 |
| 2,480,532 | Winnek et al. | Aug. 30, 1949 |
| 2,494,524 | Sprague | Jan. 10, 1950 |

FOREIGN PATENTS

| Number | Country | Date |
| --- | --- | --- |
| 210,833 | Switzerland | Aug. 15, 1940 |
| 563,936 | Great Britain | Sept. 6, 1944 |
| 244,345 | Switzerland | Sept. 15, 1946 |